April 30, 1929.  W. M. HEPBURN  1,710,772
METHOD OF AND APPARATUS FOR THE CONTROL OF COMBUSTION
Filed Dec. 10, 1923  5 Sheets-Sheet 1

INVENTOR
William M. Hepburn
BY
Arthur J. Rens
his ATTORNEY

April 30, 1929. W. M. HEPBURN 1,710,772
METHOD OF AND APPARATUS FOR THE CONTROL OF COMBUSTION
Filed Dec. 10, 1923 5 Sheets-Sheet 2
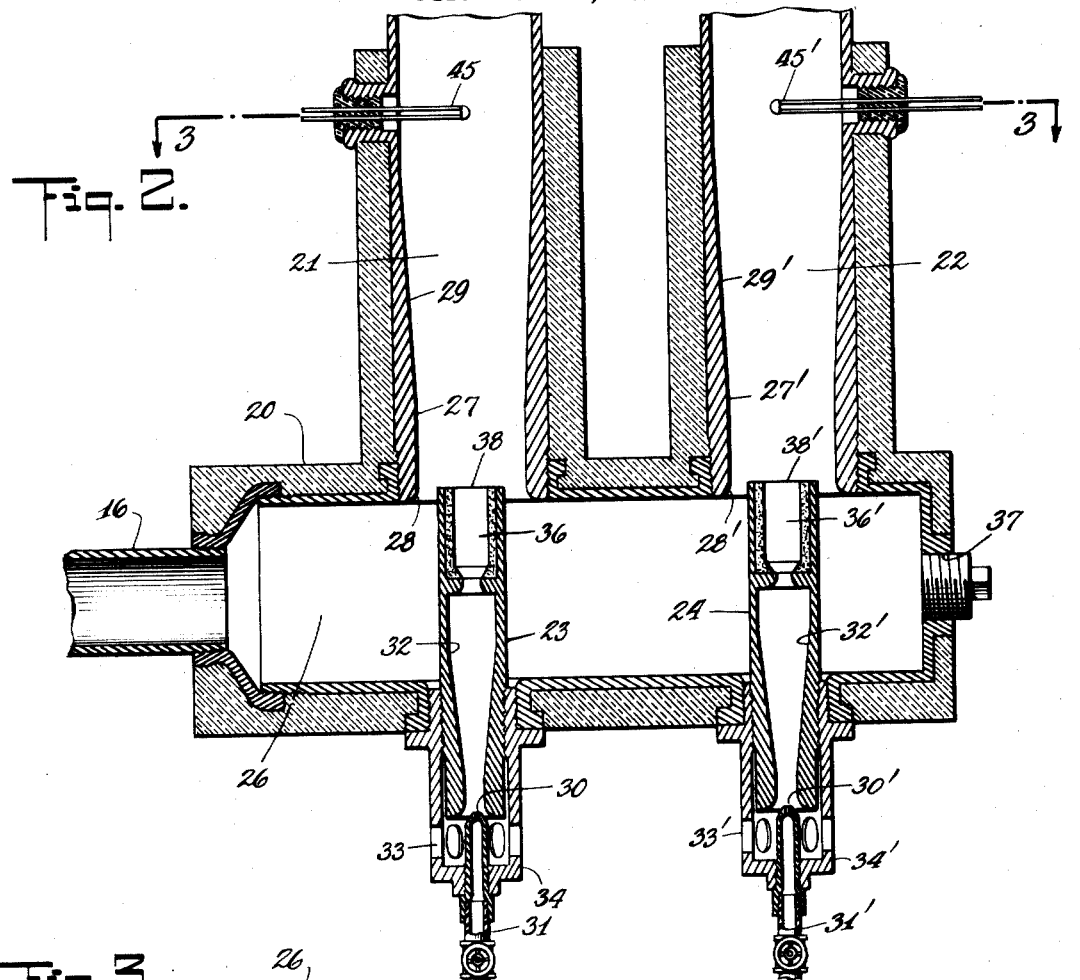
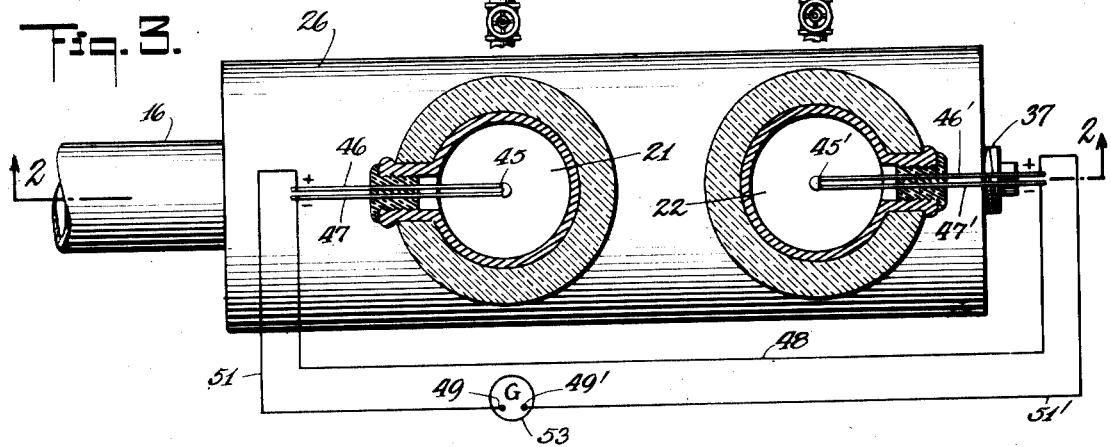
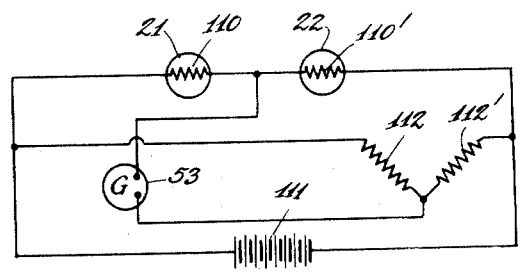
INVENTOR
William M. Hepburn
BY
Arthur L. Kent
his ATTORNEY

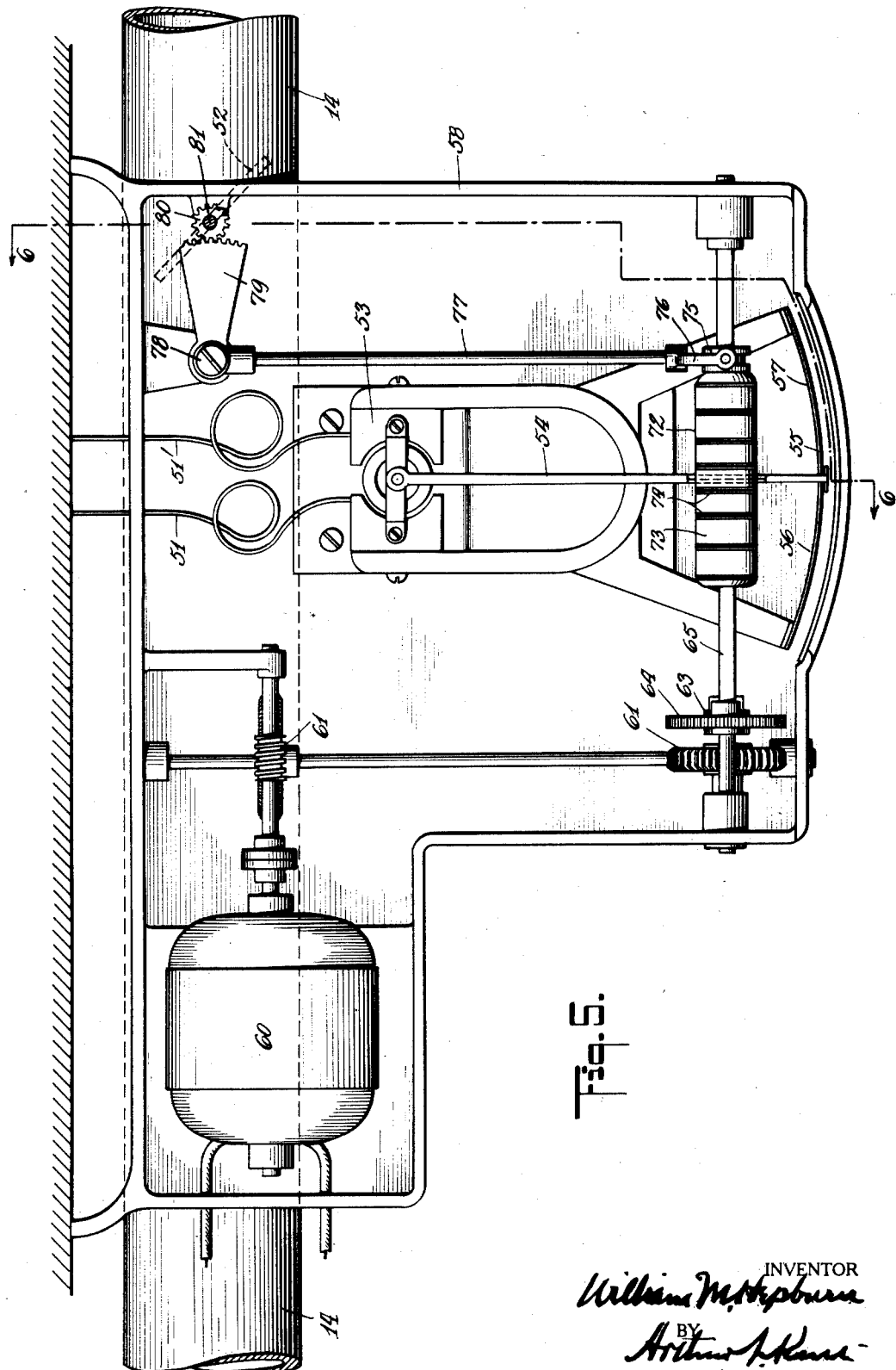

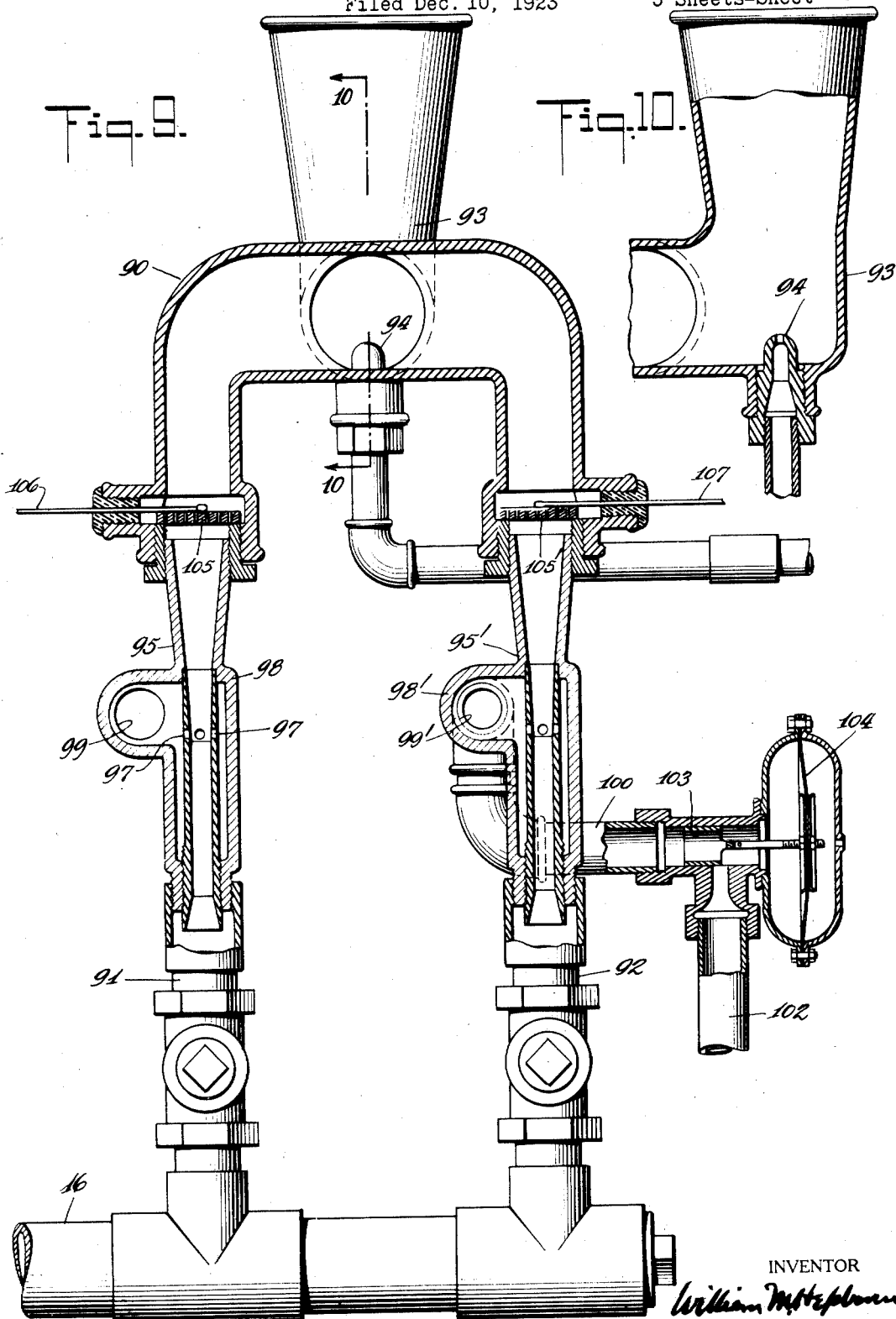

Patented Apr. 30, 1929.

1,710,772

UNITED STATES PATENT OFFICE.

WILLIAM M. HEPBURN, OF NEW YORK, N. Y., ASSIGNOR TO SURFACE COMBUSTION COMPANY, OF NEW YORK, N. Y., A CORPORATION OF NEW YORK.

METHOD OF AND APPARATUS FOR THE CONTROL OF COMBUSTION.

Application filed December 10, 1923. Serial No. 679,527.

This invention relates to method of and apparatus for the control of combustion and aims to increase the efficiency of furnaces of all sorts.

In its most complete form, the invention provides for automatic control of combustion in accordance with the composition of the flue gas produced by the combustion. In furnaces where the fuel is supplied continuously, the control may be exercised either by governing the rate of fuel supply or by governing the rate at which air is supplied to the furnace, while in furnaces where the fuel is supplied intermittently, the control is exercised by governing the rate of air supply. Thus, in either case the control is effected by varying the proportion between the rate at which air is supplied to the furnace and the amount of fuel supplied to the furnace. By automatically regulating this proportionate rate of air supply in accordance with the composition of the flue gas produced in the furnace, the invention effects continuous operation of furnaces at their points of most efficient combustion.

The invention is of especial value when used in connection with gas-burning furnaces in which it is possible to obtain complete combustion of the fuel without heating any excess air. When the combustion in such furnaces is controlled in accordance with the invention, continuous perfect combustion may be obtained.

The invention is also of value in controlling combustion in furnaces to which some excess air must be supplied in order to secure complete combustion of the fuel. Most coal and oil-burning furnaces are of this character. When combustion in such furnaces is controlled in accordance with the invention, the furnaces may be operated at their points of most efficient combustion, that is to say, complete combustion may be continuously obtained, while the excess air is reduced to the minimum required to support such combustion in the particular type of furnace used.

In addition to its use in controlling combustion, the invention provides also for instantaneously and continuously indicating the composition of the flue gas from a furnace. When applied to furnaces capable of perfect combustion, the invention serves to indicate both the percentage of excess air, if any, contained in the flue gas and the percentage of unburned or partially burned fuel, if any, contained in the flue gas.

In carrying out the invention in a way which I have found most satisfactory in practice, a sample of flue gas is continuously withdrawn from the upper part of the combustion space of the furnace or from the flue or chimney of the furnace, and this sample is divided into two streams. Oxygen is introduced into one of these streams, while fuel is introduced into the other. By some means such as the application of heat or the use of a catalytic agent, any fuel and oxygen which may simultaneously be present in either stream are caused to combine. As a result, if any unburned or incompletely burned fuel is present in the flue gas, this fuel combines with the oxygen which is introduced into the first stream and raises the temperature of this stream; and, conversely, if any excess air is present in the flue gas, the oxygen contained in this air combines with the fuel which is introduced into the second stream and raises the temperature of this stream. The algebraic difference in the temperatures attained in the two streams serves to indicate whether the flue gas contains a greater amount of unconsumed fuel than excess air or whether it contains more excess air than unconsumed fuel. This difference in the temperatures of the two streams is used to control automatic regulating apparatus which serves to regulate the proportionate rate of the air supply to the furnace. The regulating apparatus may be adjusted to govern the proportionate rate of air supply in such manner that complete combustion is continuously obtained in the furnace with the minimum amount of excess air required for such combustion in the furnace. When the control is applied to a furnace capable of perfect combustion, the controlling apparatus may be adjusted so that no excess air is used.

In order that the nature of the invention may clearly be understood, I will describe in detail the apparatus illustrated in the accompanying drawings, which provides means for carrying out the method of the invention and embodies the apparatus features of the invention.

In the drawings:

Fig. 2 is a front elevation of the gas analyzer shown in Fig. 1 sectioned on the line 2—2 of Fig. 3;

Fig. 3 is a top view of this analyzer sectioned on the line 3—3 of Fig. 2 and showing diagrammatically the electric connections between the analyzer and the galvanometer of the indicating mechanism;

Fig. 4 is a diagram showing the electric connections for a modified form of indicating mechanism;

Fig. 5 is a top view of the indicating and regulating mechanism shown in Fig. 1, the cover for the casing of this mechanism being removed;

Fig. 9 is a front elevation, partly in section, of a modified flue gas analyzer which may be substituted for the analyzer shown in Figs. 1, 2 and 3; and Fig. 10 is a fragmentary side elevation of this analyzer sectioned on the line 10—10 of Fig. 9.

Figure 1:
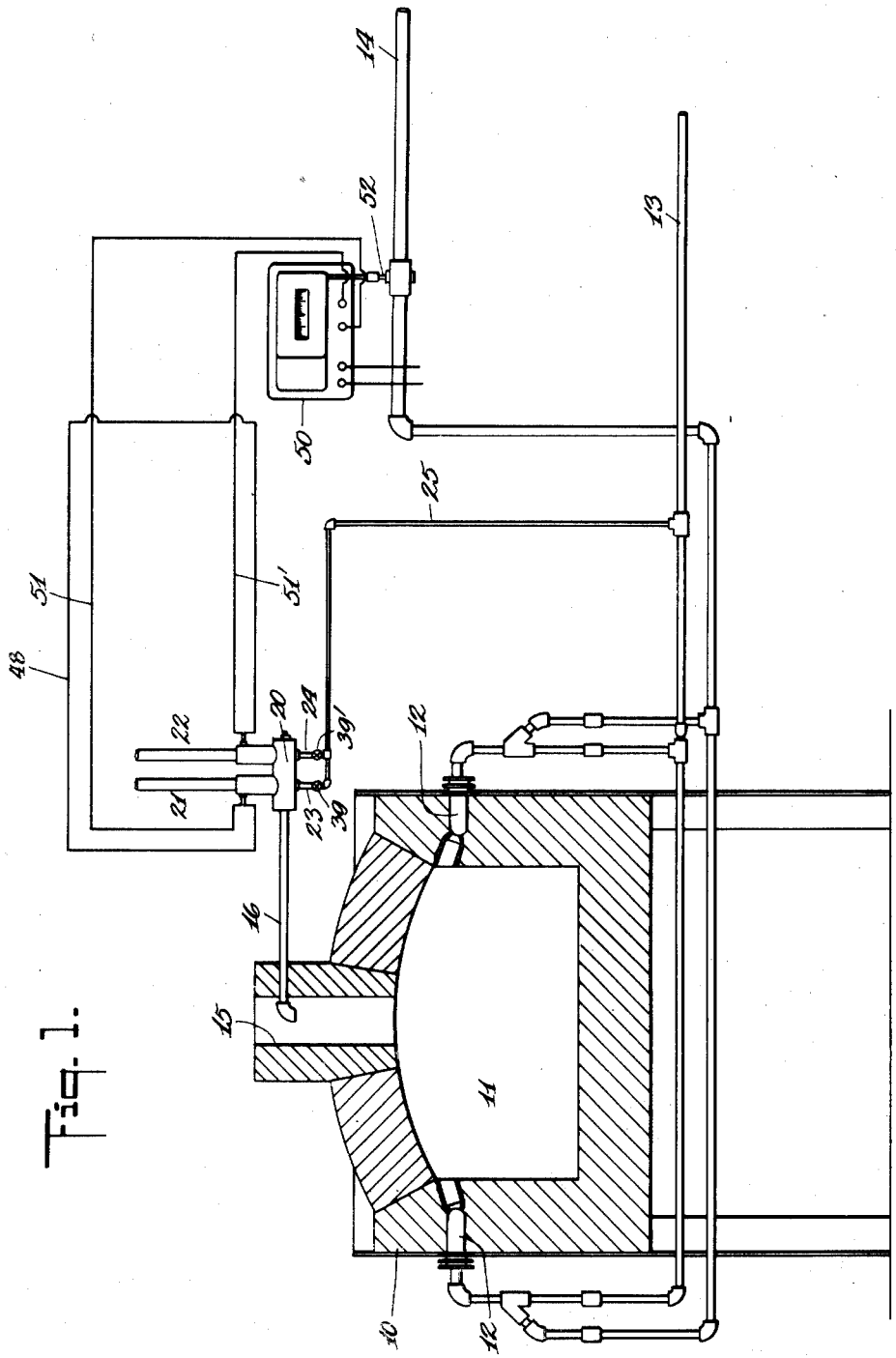
Fig. 1 is a diagrammatic elevation showing, by way of illustration, a so-called "surface combustion" gas-burning furnace and a form of apparatus for controlling the combustion in this furnace in accordance with the invention.
Figure 6:
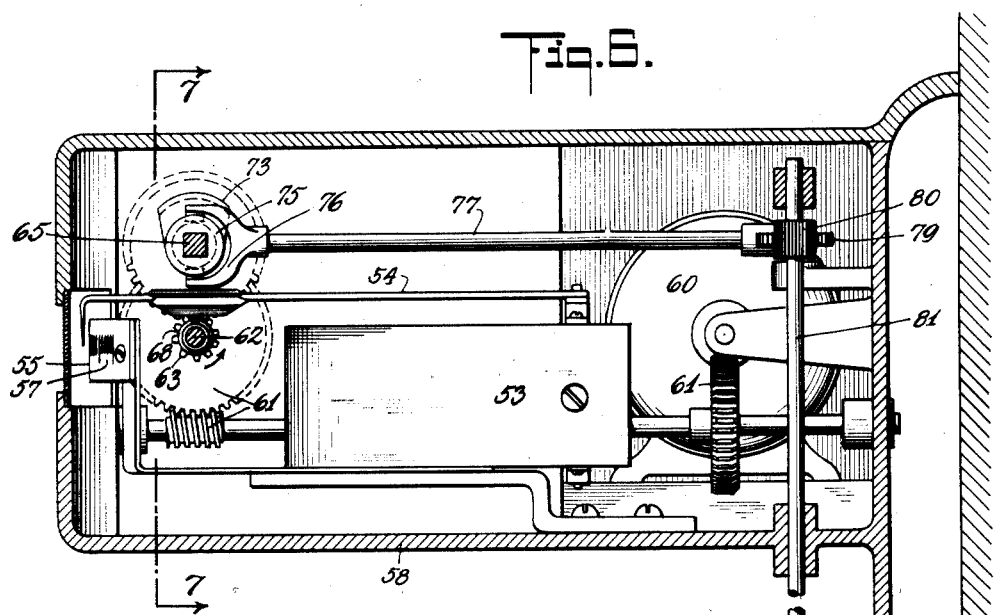
Fig. 6 is a side elevation of this indicating and regulating mechanism sectioned on the line 6—6 of Fig. 5.

While the invention may be applied to controlling combustion in any type of fuel burning furnace, the greatest advantages of the invention are obtained when it is used to control combustion in a furnace which is adapted for perfect combustion, that is, complete combustion without heating excess air. As typical of a furnace of this type, I have shown in Fig. 1 a surface combustion furnace 10, whose furnace space 11 is heated by the combustion of an explosive mixture of fuel gas and air which is introduced through burners 12. The fuel gas is supplied to these burners through a pipe 13 and the air is supplied to them through a pipe 14. The flue gas which results from the combustion in the furnace space 11 passes out of this space through a flue or chimney 15. A sample of this flue gas is continuously withdrawn from the flue 15 through a pipe 16 and divided into two streams which pass through separate conduits 21, 22 of the gas analyzer 20. The analyzer 20 includes two gas burners 23, 24, which are directed into the conduits 21, 22, respectively, and are supplied with gas by a pipe 25 branching from the gas supply pipe 13. As hereinafter explained, the burner 23 is adjusted to introduce free oxygen into the stream of flue gas in the conduit 21, while the burner 24 introduces unconsumed fuel into the stream of flue gas in the conduit 22.

Indicating and regulating mechanism 50 connected with the analyzer 20 by electric conductors 51, 51', serves to indicate the composition of the flue gas and also to operate a damper or valve 52 in the air supply pipe 14 so as to control the proportionate rate of air supply to the burners 12. Alternatively, control may be exercised by arranging the regulating mechanism to operate a valve in the gas supply pipe 13.

The construction of the gas analyzer 20 is best shown in Figs. 2 and 3. The analyzer includes a cylindrical chamber 26, one end of which is in communication with the pipe 16. The two conduits 21, 22 lead off from the upper side of the chamber 26. These conduits are formed to provide Venturi tubes 27, 27', having entrance cones 28, 28', communicating with the chamber 26 and gradually expanding discharge cones 29, 29', directed upwardly in the conduits 21, 22. The gas burners 23, 24 extend into the chamber 26 through openings in its lower wall and project into the Venturi tubes 27, 27', respectively, cooperating therewith to provide constant proportion inspirators of a known type. Each gas burner also includes such an inspirator adapted to maintain a constant proportion between the gas supplied to it and the air entrained by the gas, regardless of variations in the entraining pressure. The gas burner 23 has a nozzle 30 to which fuel gas is supplied under pressure from a pipe 31 connected with the pipe 25. The nozzle 30 is directed into the entrance cone of a Venturi tube 32, and the fuel gas issuing from this nozzle serves to entrain air, drawn through openings 33 in a casing 34 which surrounds the nozzle and the entrance end of the Venturi tube, and mixes thoroughly with this air in the Venturi tube 32. From the pressure cone of the Venturi tube 32 the gas and air mixture is discharged through a suitable restricted discharge orifice into a cylindrical combustion chamber 36 which projects into the entrance cone of the Venturi tube 27 of the conduit 21. After the burner 23 has been lighted by a torch inserted through a plugged hole 37 in the end of the chamber 26, combustion takes place in the combustion chamber 36 and a hot jet from this chamber is projected into the Venturi tube 27, entraining with it a constant proportion of flue gas from the chamber 26. In this way a continuous stream of flue gas is caused to flow upwardly through the conduit 21. In the throat and the expanding cone 29 of the Venturi tube 27 the flue gas is thoroughly mixed with the products of combustion issuing from the combustion chamber 36.

The nozzle 30 of the burner 23 and the Venturi tube 32 are so proportioned that the air drawn into the Venturi tube 32 is in excess of the amount which will combine with the gas issuing from the nozzle 30. The excess of air is made as great as possible with the maintenance of a steady flame. The percentage of excess air should be over 25%. The area of the discharge opening 38 of the combustion chamber 36 is so proportioned to the throat of the Venturi tube 27 that the proportion of flue gas entrained into the Venturi tube 27 by the hot jet issuing through the opening 38 is such that the excess air in the jet is sufficient to combine with the maximum amount of unconsumed fuel which may be present in the stream of flue gas drawn into conduit 21 during ordinary operation of the furnace 10.

The burner 24 is similar in construction and arrangement to the burner 23 except that the orifice in its gas nozzle 30' is larger than that of the nozzle 30 of the burner 23 and is so proportioned to its Venturi tube 32' that the air entrained into this Venturi tube is insufficient for complete combustion of the gas issuing from the nozzle 30'. The proportioning should be such that over 5% excess gas is supplied to the burner 24. The area of the discharge opening 38' of the combustion chamber 36' is so proportioned to the throat of the Venturi tube 27' that the proportion of flue gas entrained into the Venturi tube 27' by the hot jet issuing from the opening 38' is such that the excess of fuel in the jet is sufficient to combine with the maximum amount of excess air which may be present in the stream of flue gas drawn into the conduit 22 in ordinary operation of the furnace 10.

By adjusting valves 39, 39' in the gas pipes 31, 31', the rates at which fuel gas is supplied to the two burners 23, 24 are so proportioned that the temperatures which are maintained in the conduits 21, 22 by the combustion produced by the burners 23 and 24 when the flue gas is perfect, or when no other air or gas of any kind is admitted to the conduits are equal. The temperature maintained in each conduit by the combustion produced by its burner is above the ignition temperature of the fuel used in the furnace, so that whenever oxygen and unconsumed fuel are simultaneously present in either conduit by reason of the introduction of air or unconsumed fuel into the conduit a reaction between the two takes place, and this reaction or combustion produces heat in addition to the heat due solely to the two burners.

The operation of the analyzer 20 is as follows: When the proportion between the air supply and the fuel gas supply to the burners 12 is such that perfect combustion is obtained in the furnace space 11, so that the flue gas contains neither unburned fuel nor excess air, the streams of flue gas flowing through the conduits 21, 22 contain neither unconsumed fuel to combine with the excess air issuing from the burner 23 nor excess air to combine with the excess fuel issuing from the burner 24, and the presence of the flue gas in the two conduits, therefore, causes no increase in temperature in either conduit. Under this condition, therefore, the temperatures maintained in the two conduits are equal. Whenever, because of insufficient air supply to the burners 12, the flue gas contains unconsumed fuel, such as unconsumed hydrocarbons, or partially consumed fuel in the form of carbon monoxide gas, the fuel in the stream of flue gas in the conduit 21 combines with the excess air from the burner 23, raising the temperature in the conduit 21. Under these conditions no reaction takes place in the conduit 22, so that the temperature attained in this conduit is unchanged. Whenever, on the other hand, because of an excess supply of air to the burners 12, the flue gas contains excess oxygen, the oxygen in the stream of flue gas in the conduit 22 combines with the unconsumed excess fuel gas of the burner 24 and raises the temperature attained in the conduit 22. Under these circumstances, no reaction takes place in the conduit 21 and the temperature attained in this conduit is, therefore, unaffected. The increase in temperature in the conduit 21 which results from the presence of unconsumed fuel in the flue gas is a definite function of the percentage of the unconsumed fuel in the flue gas, and I have ascertained by experiment that the increase in temperature is approximately proportional to the percentage of unconsumed fuel over a considerable range. Similarly, the increase of temperature in the conduit 22 which results from the presence of excess air in the flue gas is a definite function of the percentage of excess air in the flue gas and is approximately proportional to this percentage over a considerable range.

It is thus apparent that the algebraic difference in the temperatures attained in the two conduits 21, 22 indicates the composition of the flue gas. When the analyzer is used in connection with a surface combustion furnace or other furnace capable of perfect combustion, so that excess air and unconsumed fuel are never simultaneously present in the flue gas, the algebraic difference between the temperatures in the two conduits gives a direct indication of the composition of the flue gas. Thus, when the temperature in the conduit 21 is higher than that in the conduit 22, the difference between the two temperatures will indicate the percentage of unconsumed fuel present in the flue gas, while when the temperature in the conduit 22 is the higher, the difference between the temperatures will indicate the percentage of excess air present in the flue gas. An equality between the two temperatures in the two conduits indicates that neither unburned fuel nor excess air is contained in the flue gas, or, in other words, that the combustion in the furnace is perfect.

Any one of a number of known temperature measuring devices may be used to indicate the difference between the temperatures attained in the conduits 21, 22, and thus to indicate the composition of the flue gas. In Figs. 2, 3, 5 and 6 I have shown the use of a pyrometer for this purpose. Thermal couples 45, 45' project into the conduits 21, 22, respectively, at the outer ends of the Venturi tubes 27, 27'. The negative elements 47, 47' of the two couples are joined by a conductor 48 while the conductors 51, 51' connect the positive elements 46, 46' of the couples 45, 45' to the terminals 49, 49' of a galvanometer 53 so that the electromotive forces of the two couples are opposed.

The positive element 46 of the couple 45 in the conduit 21 is connected to the normally negative terminal 49 of the galvanometer so that the electromotive forces of the two couples are opposed in such manner that the position of the needle 54 of the galvanometer 53 on a scale 55 indicates the algebraic difference between the temperature in the conduit 22 and the temperature in the conduit 21. The coils of the galvanometer are so arranged that when this algebraic difference is zero, that is, when the temperatures of the two conduits are equal, the needle 54 is at the central or zero position on the scale 55. When, because of the presence of excess air in the flue gas, the temperature in the conduit 22 is the higher, the algebraic difference is a positive quantity and the needle 54 is on the positive side 56 of the scale 55. When, on the other hand, because of the presence of unconsumed fuel in the flue gas, the temperature in the conduit 21 is the higher, the algebraic difference becomes a negative quantity and the needle 54 lies on the negative side 57 of the scale 55. The scale 55 may be so graduated that the position of the needle on the side 56 of the scale indicates the percentage of excess air present in the flue gas, while the position of the needle on the side 57 of the scale indicates the percentage of unconsumed fuel in the flue gas.

The position of the galvanometer needle on the scale is not affected by outside influences, that is to say, influences other than changes in the composition of the flue gas, for, although such influences may change the temperatures in the analyzer 20, the changes which they cause affect the temperatures in the two conduits of the analyzer to a corresponding extent and therefore do not change the difference between these temperatures which is indicated by the galvanometer. Thus, a variation in the furnace temperature and in the temperature of the flue gas withdrawn from the furnace has equalizing effects in the two conduits 21 and 22. A variation in the furnace pressure may change the temperatures in the analyzer by changing the rate of flow of the flue gas through the analyzer, but in this case, also, the flow of the flue gas through the two conduits of the analyzer are affected to a corresponding extent so that no change in the relative temperature in the two conduits is caused. A variation in the pressure of the fuel gas in the branch pipe 25 may affect the heat produced in each of the burners 23, 24, but since the burners are supplied with fuel from the same source, the effects of such variations in pressure correspond in the two burners causing no change in relative heat of the two burners. Such variations of pressure of the fuel supply cause changes in the rates of flow of the jets projected from the two burners, but the ratio between rates of flow of these two jets remains unchanged, and in consequence the ratio between the rates of flow of the streams of flue gas entrained by these jets also remains unchanged, and the relative temperature of the two streams is unaffected.

The combining of any excess air in the flue gas with the excess fuel which was introduced into the conduit 22 of the analyzer, or the combining of any unconsumed fuel in the flue gas with the excess air which is introduced into the conduit 21, takes place practically instantaneously because of the high temperature maintained in the analyzer by the burners, and the relative temperature of the two conduits is indicated practically instantaneously by the action of the thermal couples and the galvanometer. It follows that if the analyzer 20 is placed close to the furnace as shown in Fig. 1, the needle 54 of the galvanometer 53 indicates the composition of a particular sample of flue gas substantially at the same time that this sample is produced in the furnace. This practically instantaneous indication of the composition of the flue gas is of great importance in carrying out my method of controlling combustion. It enables me to control the combustion in the furnace in accordance with the composition of the flue gas actually being produced therein, and thereby enables me to control the combustion in a manner which would be impossible were it necessary to base the control on analyses of the flue gas which was produced a considerable time before the control was exercised.

My method of controlling combustion may be carried out manually by an operator who observes the position of the needle 54 on the scale 55 and operates a valve in the air pipe 14, or a valve in the gas pipe 13, in such manner as to decrease the proportionate supply of air to the burners 12 whenever the needle 54, by moving to the side 56 of the scale, indicates the presence of excess air in the flue gas, and to increase the proportionate supply of air whenever the needle, by moving to the side 57 of the scale, indicates the presence of unconsumed fuel in the flue gas. An important feature of the invention, however, consists in eliminating the necessity for such an operator and the element of human carelessness involved in relying on an operator, by providing for automatic control of the proportionate supply of air to the furnace in accordance with the position of the needle 54. Such automatic control may be provided by electrical or pneumatic regulating mechanism such as has heretofore been used in thermostatic apparatus. Such regulating mechanism, however, causes a movement of a predetermined extent in a valve or damper whenever the controlling needle reaches one end of a predetermined range, and is, therefore, unable to give the accurate control of the proportionate supply of air to the furnace which is desirable in order to maintain perfect combustion. For this reason I prefer to use a novel regulating mechanism which engages the controlling needle 54 at frequent and regular time intervals, and, on each engagement, causes a movement of a valve in the air pipe or the gas pipe, proportional in extent, and corresponding in direction, to the displacement of the needle 54 from the zero point at the time of that engagement. Figs. 5 to 8 illustrate a mechanical regulating mechanism which has this operation, and which forms the subject matter of my co-pending application filed May 29, 1924, Serial No. 716,619.

The regulating mechanism is located in a casing 58 which also contains the galvanometer 53. The regulating mechanism includes a constant speed electric motor 60 which, through reducing gearing 61, drives a horizontal shaft 62 extending under the needle 54 near the outer end thereof. The direction of rotation of the shaft 62 is indicated by an arrow in Fig. 6. A pinion 63 on the shaft 62 meshes with a large gear 64 on a shaft 65 which extends parallel to the shaft 62 and just above the needle 54. A worm gear 66 is fixed on the shaft 62 by means of a set screw 67. The worm gear 66 has a right-hand raised thread 68 and a left-hand raised thread 69 and a central space 70 between the two threads. When the device is used in connection with a surface combustion furnace, or other furnace capable of perfect combustion, the worm gear 66 is secured to the shaft 62 in such position that its central space 70 is directly under the needle 54 when the needle is at the center or zero point of the scale 55. The shaft 65 is square and carries a slidable engaging member 72 which has a projection whose outer surface 73 is a sector of a cylinder coaxial with the shaft 65. On the surface 73 are spaced circumferential ridges 74. A grooved collar 75 is secured to the engaging member 72, and a fork 76 on a rod 77 engages the groove in this collar. The rod 77 is pivoted at 78 adjacent to a portion of the air pipe 14. At its pivoted end the rod 77 carries a laterally extending gear segment 79 which engages a pinion 80 fixed on the shaft 81 of the butterfly valve of damper 52 in the air pipe 14.

Figure 8:
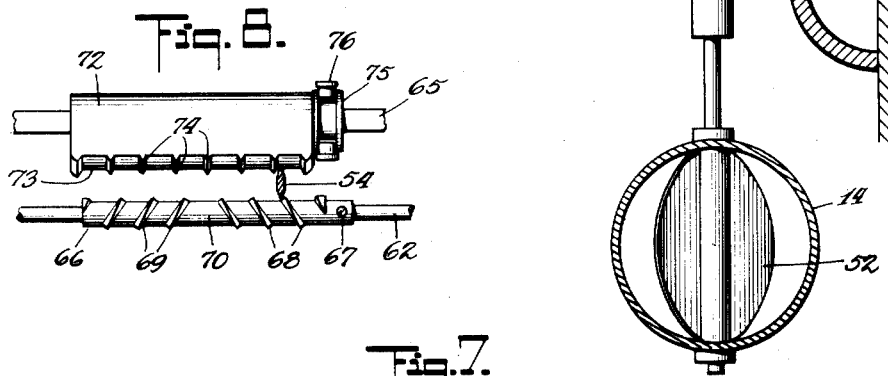
Fig. 8 is a fragmentary section on the line 7—7 of Fig. 6 showing parts of the regulating mechanism in a position different from that shown in Fig. 7.
Figure 7:
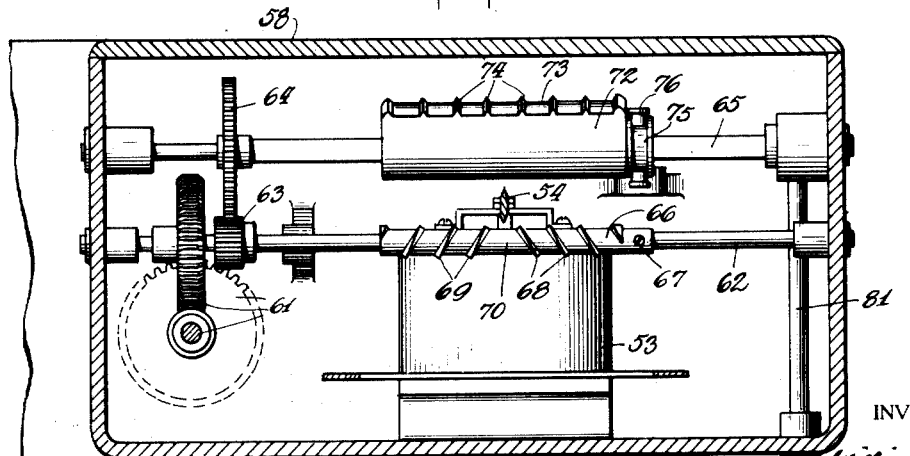
Fig. 7 is a front elevation of this indicating and regulating mechanism sectioned on the line 7—7 of Fig. 6.

The operation of the regulating mechanism which has been described is as follows:—The needle 54 normally lies above the threads 68, 69 of the worm gear 66, as shown in Fig. 7, so that it is free to assume the position into which it is urged by the coil of the galvanometer 53. At regular intervals, that is to say, on each revolution of the shaft 65, the cylindrical surface 73 of the engaging member 72 comes in contact with the needle 54 and depresses the needle. If the needle is at central or zero position, as shown in Fig. 7, it is depressed into the space 70 between the threads 68 and 69, and neither the needle nor the engaging member are moved longitudinally of the shafts 62 and 65. If, however, the needle happens to be displaced from the zero position when it is forced down by the cylindrical surface 73 of the engaging member, the needle is brought between two turns of one of the raised threads 68 or 69 of the worm gear 66. The needle is then engaged by this thread, for example, by the thread 68, as shown in Fig. 8, and the rapid rotation of the shaft 62 causes this thread to move the needle back to the inner end of the thread, that is to say, to its zero position, during the time that the needle is depressed by the cylindrical surface 73 of the engaging member 72. In such lateral movement of the needle, the needle is brought into engagement with one of the circumferential ridges 74 of the engaging member, as shown in Fig. 8, so that the engaging member is moved with the needle and travels longitudinally along the shaft 65 a distance equal to the extent to which the needle was displaced from the zero point when the engaging member came into contact with it. Through the fork 76, the rod 77, and the gear segment 79, such movement of the engaging member 72 causes a corresponding movement of the damper 52 in the air pipe 14. If, at the time the needle is engaged by the cylindrical surface 73 of the engaging member, the needle is at the side 56 of the scale 55 indicating the presence of excess air in the flue gas, the needle and the engaging member are moved to the right by the thread 69, closing the damper 52 to an extent proportional to the amount of the displacement of the needle. Conversely, when, at the time of engagement, the needle is at the side 57 of the scale indicating the presence of unconsumed fuel in the flue gas, the needle and the engaging member are moved to the left by the thread 68, opening the damper 52 to an extent proportional to the amount of the displacement of the needle.

From the above description it is apparent that the apparatus which has been described serves continuously to indicate the composition of the flue gas from the furnace 10, and serves also to regulate the proportionate supply of air to the furnace in accordance with the composition of the flue gas. During the operation of the controlling apparatus the difference between the temperatures in the two conduits of the analyzer remain within the range in which the difference in temperature is approximately proportional to the percentage of unconsumed fuel or the percentage of excess air in the flue gas. The apparatus, therefore, serves to adjust the position of the damper 52 in the air pipe at regular and frequent intervals in such manner that, on each adjustment, the damper is opened or closed to an extent approximately proportional to the percentage of unburned fuel, or the percentage of excess air, present in the flue gas at the time of that adjustment. The apparatus thus acts as a governing device, reducing the proportionate supply of air whenever the composition of the flue gas indicates that too much air is being supplied and increasing the proportionate supply of air whenever the composition of the flue gas indicates an insufficient supply of air. As a result, substantially perfect combustion is obtained continuously in the furnace 10.

The utility of the controlling apparatus which has been described is not limited to use in connection with a surface combustion furnace or other furnace capable of perfect combustion. The apparatus may be used to control the combustion in coal or oil burning furnaces in which the condition of perfect combustion cannot be obtained. In applying the apparatus to the control of combustion in such furnaces, it is first necessary to determine the point of most efficient combustion of the particular furnace to be used. This usually, although not necessarily, is the point at which the proportionate rate of air supply to the furnace is so adjusted that complete combustion is obtained with the use of a minimum amount of excess air. When the point of most efficient combustion possible in the furnace has been determined by experiment, by flue gas analysis, or otherwise, a sample of the flue gas produced in the furnace when operated at the point is passed through the analyzer 20 and the position of the needle 54 on the scale 55 is noted. With ordinary coal or oil-burning furnaces it will be found that when most efficient combustion is obtained the needle 54 occupies some position on the positive side 56 of the scale 55, indicating that the algebraic difference between the temperature in the conduit 22 and the temperature in the conduit 21 has a positive value. After the point on the scale 55 which represents most efficient combustion for the particular furnace concerned has been determined, the needle 54 is held at this point and the worm gear 66 is moved along the shaft 62 until its central space 70 lies directly under the needle. The set screw 67 is then tightened, and the device is properly adjusted for controlling the combustion of the furnace in question. It will be apparent from the operation of the regulating mechanism, which has already been described, that, when so adjusted, it will automatically reduce the air supply to the furnace when the algebraic difference between the temperature in the conduit 22 and the temperature in the conduit 21 exceeds a predetermined value, and will automatically increase the air supply when this algebraic difference falls below said predetermined value. The result is so to govern the air supply that the algebraic difference is always substantially equal to the predetermined value so that most efficient combustion is obtained continuously.

The gas analyzer 20 may be used to indicate the composition of the flue gas from furnaces incapable of perfect combustion, by providing separate means for indicating the temperatures attained in its two conduits 21 and 22. In this case the rise in the temperature of the conduit 21 above the normal temperature of the flue gas may be made to indicate the percentage of unconsumed fuel present in the flue gas, while the rise in the temperature of the conduit 22 above the normal temperature of the flue gas may be made to indicate the percentage of excess air. The percentages of unconsumed fuel and excess air will, therefore, both be indicated, notwithstanding the fact that both excess air and unconsumed fuel may be present at the same time.

The invention is by no means limited to use of the particular parts of the system and apparatus which has been described; and in order that the scope and nature of the invention may be better understood, I will describe certain modified apparatus which may be substituted for parts of the apparatus which has been described.

It is not essential that the air and fuel gas which are introduced into the conduits 21, 22 of the analyzer 20 be introduced through gas burners, nor is it essential that the flow of the streams of flue gas be produced by the entraining effect of the air and fuel gas introduced into the conduits. Furthermore the reaction between any fuel and oxygen which may simultaneously be present in either conduit may be caused by means other than ignition.

In Figs. 9 and 10 I have shown a gas analyzer 90 which may be substituted for the analyzer 20 which has been described. The gas analyzer 90 provides two separate streams of flue gas into which air and fuel gas are introduced by the entraining action of the streams. The reactions in the two streams are caused by masses of catalytic or occulting material.

The gas analyzer 90 has two conduits 91, 92 which are connected at their lower ends with the pipe 16 leading from the flue of the furnace 10. The two conduits are joined at their outer ends and at their juncture are connected to an aspirator 93 into which a driving jet of air or steam is forced through a nozzle 94. The aspirator creates a partial vacuum at the upper ends of the two conduits so that a continuous stream of flue gas is drawn through each conduit. When, however, the device is used in connection with a furnace in which a super-atmospheric pressure is maintained by a forced draft or otherwise, the furnace pressure may be relied on to cause the flue gas to flow through the conduits 91 and 92, and the aspirator 93 need not be used. It should be noted that changes in the force of the driving jet of the aspirator 93 or changes in the furnace pressure have corresponding effects on the rates of flow through the two conduits 91, 92, so that, regardless of such changes, the ratio between the rates of flow of the flue gas through the two conduits remains constant.

The flow of the flue gas through the conduit 91 is utilized to entrain air into this conduit at a rate proportional to the rate of the flow of the flue gas through the conduit. For this purpose an inspirator is inserted in the conduit 91, which inspirator consists of Venturi tube containing transverse holes 97 located near its point of minimum cross section. The flow of the stream of flue gas through the Venturi tube entrains atmospheric air through the holes 97. In order to protect the throat of the tube, the throat may be surrounded by a casing 98 containing a hole 99 open to the atmosphere. By proper proportioning of the Venturi tube, the proportion of air entrained and mixed with the flue gas is regulated so that it remains constant and is sufficient to combine with the maximum amount of unconsumed fuel which may be present in the flue gas flowing through the conduit 91 in the normal operation of the furnace 10.

The flow of the flue gas through the conduit 92 is utilized to entrain fuel gas at a rate which bears a constant proportion to the rate of the flow of the flue gas through the conduit 92. For this purpose the conduit 92 contains an inspirator 95' which is similar to the inspirator 95 except that the opening 99' in its casing 98' is connected by a pipe 100 to a fuel gas supply pipe 102 which may branch off from the fuel pipe 13 which supplies the burners 12. In order that the proportion of fuel gas drawn into the conduit by the flue gas shall be maintained constant regardless of changes in the rate of flow of the stream of flue gas, the fuel gas should be supplied to the inspirator at a constant pressure. For this purpose a pressure governor comprising a valve 103 controlled by a diaphragm 104, exposed on one side to the pressure in the pipe 100 is provided between the pipe 100 and the supply pipe 102, whereby a supply of fuel gas at constant pressure is maintained in the pipe 100. By proper proportioning of the parts of the inspirator 95' the proportion of fuel gas drawn into the conduit 92 is made sufficient to combine with the maximum amount of excess air which may be present in the flue gas flowing through the conduit 92 in the normal operation of the furnace 10.

Masses 105, 105' of catalytic or occluding material, such as spongy platinum, are placed in the conduits 91, 92 beyond the inspirators 95, 95'. These masses cause the combining of any fuel and oxygen which may simultaneously be present in either conduit. The temperatures attained in the two conduits are measured by means of thermal couples 106, 107 which may be connected to the terminals of the galvanometer 53 in the same way as the thermal couples 45, 45' of the analyzer 20.

The operation of the analyzer 90 is similar to that of the analyzer 20. The presence of unconsumed fuel in the flue gas raises the temperature of the thermal couple 106, while the presence of excess air raises the temperature of the thermal couple 107. The operation of the indicating and regulating mechanism 50 is, therefore, the same when the analyzer 90 is used as when the analyzer 20 is used.

If the analyzer 90 is located so close to the furnace that the temperature of the flue gas in the analyzer is above the ignition point of the fuel, the catalytic masses 105, 105' may be omitted, as in this case the heat of the flue gas will cause the combining of any free oxygen and fuel simultaneously present in either conduit.

Heat indicating means other than the pyrometer couples shown in Figs. 2 and 9 may be used to indicate the difference in the temperatures attained in the conduits of either type of analyzer and to actuate, or control, the regulating mechanism. Thus, as indicated in Fig. 4, resistance wires 110, 110' may be passed through the conduits 21 and 22 respectively, and these wires may be connected with a source of electromotive force 111, and with two equal resistances 112, 112' and with the galvanometer 53 in accordance with the well-known Wheatstone bridge circuit, so that variations in the resistances of the wires 110, 110' caused by differences in the temperatures of the wires may cause the operation of the galvanometer 53. When this type of heat indicating means is applied to the analyzer 90 shown in Fig. 9 the resistance wires may be made of occulting material such as platinum, and may thus replace both the thermal couples 107, 107' and the catalytic masses 105, 105'.

Alternatively the difference in the temperatures obtained in the two conduits of either type of analyzer may be indicated and caused to control the damper 52 by means of differential expansion apparatus of known form, such for example, as that shown in U. S. Patent No. 1,331,981 or U. S. Patent No. 1,032,189.

I shall not attempt to catalogue all the changes which may be made in the specific apparatus described without departing from my invention, but I wish it clearly understood that, since the invention is based on a new principle which I have discovered and embodies a new mode of operation, the invention, in its broader aspect, is not limited to any particular form or arrangement of the mechanical means for putting it into effect.

What is claimed is:

1. Apparatus for controlling combustion, comprising in combination with a furnace, air regulating means for varying the rate of air supply to the furnace, means responsive to the presence of unconsumed air in the furnace fuel gas to cause said air regulating means to decrease the rate of air supply to the furnace, and means responsive to the presence of unconsumed fuel in the furnace flue gas to increase the rate of air supply to the furnace.

2. Apparatus for controlling combustion, comprising in combination with a furnace, air regulating means for varying the rate of air supply to the furnace, means responsive to increase in the proportion of unconsumed air in the furnace flue gas to cause said air regulating means to decrease the rate of air supply to the furnace by an amount proportionate to the increase of unconsumed air in the flue gas above a predetermined minimum, and means responsive to increase in the proportion of unconsumed fuel in the furnace flue gas to cause said air regulating means to increase the rate of air supply to the furnace by an amount proportionate to the increase of unconsumed fuel in the flue gas above a predetermined minimum.

3. Apparatus for controlling combustion, comprising the combination with a furnace and means for supplying fuel and air to the furnace at proportioned rates, of regulating means for varying the proportionate rate of air supply to the furnace, means responsive to the presence of unconsumed air in the furnace flue gas to cause said regulating means to decrease the proportionate rate of air supply to the furnace, and means responsive to the presence of unconsumed fuel in the furnace flue gas to cause said regulating means to increase the proportionate rate of air supply to the furnace.

4. Apparatus for controlling combustion, comprising the combination with a furnace and means for supplying fuel and air to the furnace at proportionate rates, of air regulating means for varying the proportionate rate of air supply to the furnace, means responsive to the presence of unconsumed air in the furnace flue gas to cause said air regulating means to decrease the proportionate rate of air supply to the furnace, and means responsive to the presence of unconsumed fuel in the furnace flue gas to cause said air regulating means to increase the proportionate rate of air supply to the furnace.

5. Apparatus for controlling combustion, comprising the combination with a furnace, of automatic means for varying the proportionate rate of air supply to said furnace at regular time intervals by increasing said supply to an extent corresponding to the proportion of unconsumed fuel present in the flue gas at the time of that adjustment if the flue gas contains unconsumed fuel at that time, and by decreasing such supply to an extent corresponding to the amount by which the proportion of excess air present in the flue gas at the time of that adjustment exceeds a predetermined minimum if the proportion of excess air in the flue gas exceeds said minimum at that time.

6. Apparatus for controlling combustion, comprising the combination with a furnace adapted for perfect combustion and means for supplying gaseous fuel and air to said furnace, of automatic means for varying the proportionate rate of air supply to said furnace at regular time intervals by increasing said proportionate rate of air supply to an extent corresponding to the proportion of unconsumed fuel present in the flue gas at the time of that adjustment if the flue gas contains unconsumed fuel at that time, and by decreasing such proportionate rate of air supply to an extent corresponding to the proportion of excess air present in the flue gas at the time of that adjustment if the flue gas contains excess air at that time.

7. Apparatus for controlling combustion, comprising the combination with a furnace, of means for continuously withdrawing flue gas from said furnace and causing said flue gas to flow in two streams, means for introducing air into the first of said streams and causing such air to combine with unconsumed fuel when present in said stream, means for introducing fuel into the second of said streams and causing such fuel to combine with excess air when present in said stream, and means automatically actuated in accordance with variation of the relative temperature of the two streams to decrease the proportionate rate of air supply to the furnace when the algebraic difference between the temperature of the second stream and the temperature of the first stream is greater than a predetermined value and to increase the proportionate rate of air supply to the furnace when such difference is less than said value.

8. Apparatus for controlling combustion, comprising the combination with a furnace adapted for perfect combustion and means for supplying gaseous fuel and air to said furnace, of means for continuously withdrawing flue gas from said furnace and for causing such flue gas to flow in two streams, means for introducing air into the first of said streams and for causing such air to combine with unconsumed fuel when present in said stream, means for introducing fuel into the second of said streams and for causing such fuel to combine with excess air when present in said stream, and means automatically actuated in accordance with variations in the relative temperature of said streams to increase the proportionate rate of air supply to the furnace when the first stream is the hotter and to decrease the proportionate rate of air supply to the furnace when the second stream is the hotter.

9. Apparatus for controlling combustion, comprising the combination with a furnace, of means for continuously withdrawing flue gas from said furnace and causing such flue gas to flow in two streams whose rates of flow bear a constant ratio to each other, means for introducing air into the first of said streams at a rate proportional to the rate of flow of the stream and for causing such air to combine with unconsumed fuel when present in said stream, means for introducing fuel into the second of said streams at a rate proportional to the rate of flow of the stream and for causing said fuel to combine with excess air when present in said stream, and automatic means operable at regular time intervals to decrease the proportionate rate of air supply to the furnace to an extent proportional to the amount by which the algebraic difference between the temperature attained in the second stream and that attained in the first stream exceeds a given value if such difference exceeds said value at the time of that adjustment, and to decrease the proportionate rate of air supply to the furnace to an extent proportional to the amount by which such algebraic difference falls below said given value if said given value exceeds such difference at the time of that adjustment.

10. Apparatus for controlling combustion, comprising the combination with a furnace adapted for perfect combustion and means for supplying gaseous fuel and air to said furnace, of means for continuously withdrawing flue gas from said furnace and causing such flue gas to flow in two streams, means for introducing air into the first of said streams and for causing such air to combine with unconsumed fuel when present in the stream, means for introducing fuel into the second of said streams and for causing such fuel to combine with excess air when present in the stream, and automatic means for varying the proportionate rate of the air supply to said furnace at regular time intervals by increasing said supply to an extent proportional to the extent by which the temperature of the second stream exceeds that of the first stream at the time of that adjustment if the second stream is the hotter at that time, and by decreasing such supply to an extent proportional to the amount by which the temperature of the first stream exceeds that of the second stream if the first stream is the hotter at the time of that adjustment.

11. The combination with a furnace, of means for continuously withdrawing flue gas from said furnace and for causing said flue gas to flow in two streams, means for introducing air into the first of said streams and for causing such air to combine with unconsumed fuel when present in said stream, means for introducing fuel into the second of said streams and for causing such fuel to combine with excess air when present in said stream, and means responsive to temperature variations in each of said streams for bringing the constitution of the flue gas back to a predetermined normal irrespective of whether the percentage of air or fuel in the flue gas is greater than the normal.

12. The combination with a furnace in which perfect combustion may be obtained and means for supplying fuel and air to said furnace, of means for continuously withdrawing flue gas from said furnace and for causing said flue gas to flow in two streams, means for introducing air into the first of said streams and for causing such air to combine with unconsumed fuel when present in said stream, means for introducing fuel into the second of said streams and for causing such fuel to combine with excess air when present in the stream, means for indicating the difference in the temperatures attained in the two streams, and means responsive to temperature variations in each of said streams for bringing the constitution of the flue gas back to a predetermined normal irrespective of whether the percentage of air or fuel in the flue gas is above normal.

13. The combination with a furnace adapted for perfect combustion, of means for withdrawing flue gas from said furnace and causing it to flow in two streams whose rates of flow bear a constant ratio to each other, means for introducing air into the first stream at a rate proportional to the rate of flow of the stream and for causing such air to combine with unconsumed fuel when present in the stream, means for introducing fuel into the second stream at a rate proportional to the rate of flow of the stream and for causing such fuel to combine with excess air when present in the stream, means for indicating the difference between the temperatures attained in the two streams, and means controlled by said indicating means for bringing the constitution of the flue gas back to a predetermined normal irrespective of whether the percentage of air or of the fuel in the flue gas is above normal.

14. The combination with a furnace adapted for perfect combustion, of means for withdrawing flue gas from said furnace and causing it to flow in two streams whose rates of flow bear a constant ratio to each other, means for introducing air into the first stream at a rate so proportioned to the rate of flow of the stream that the amount of air introduced is sufficient to support the combustion of the maximum amount of unconsumed fuel that may be present in the flue gas in the ordinary operation of the furnace, preheating means for causing such air to combine with unconsumed fuel when present in the stream, means for introducing fuel into the second stream at a rate so proportioned to the rate of flow of the stream that the fuel introduced is sufficient in amount to combine with the maximum amount of excess air which may be present in the flue gas during the ordinary operation of the furnace, preheating means for causing such fuel to combine with excess air when present in the stream, and means for indicating the difference between the temperatures attained in the two streams.

15. Apparatus for controlling combustion, comprising the combination with a furnace, of means for withdrawing a stream of flue gas from said furnace, means for introducing preheated air into said stream and causing said air to combine with unconsumed fuel when present in the stream, and means actuated by the heat caused by such combining to increase the proportionate rate of air supply to the furnace.

16. Apparatus for controlling combustion, comprising the combination with a furnace, of means for withdrawing a stream of flue gas from said furnace, means for introducing preheated fuel into said stream and causing such fuel to combine with excess air when present in the stream, and means actuated by the heat caused by such combining to decrease the proportionate rate of air supply to the furnace.

17. The combination with a furnace, of means for withdrawing a stream of flue gas from said furnace, means for introducing preheated fuel into said stream and for causing such fuel to combine with excess air when present in the stream, and means actuated by the heat caused by such combining for indicating the proportion of excess air present in the flue gas.

18. The combination with a furnace, of means for withdrawing a stream of flue gas from said furnace, means for introducing into said stream at a rate proportional to the rate of flow of the stream a preheated gas adapted to react with a constitutent of the flue gas and for causing such gas to combine with said constituent when present in the stream, and means automatically actuated according to the degree of heat produced by such combining to indicate the percentage of said constituent present in the flue gas.

19. The combination with a furnace, of means for withdrawing flue gas from said furnace and causing it to flow in two streams at rates of flow which bear a constant ratio to each other, means for introducing a mixture of hot air and products of combustion into the first of said streams and for causing such air to combine with unconsumed fuel when present in said stream, means for introducing fuel into the second of said streams and for causing such fuel to combine with excess air when present in the stream, and means automatically actuated in accordance with variations in the difference between the temperatures attained in said streams for controlling the flow of air to the furnace.

20. The combination with a furnace, of means for withdrawing flue gas from said furnace, means for causing such flue gas to flow as a single stream and as two separate streams, the flow causing means acting upon the single stream to cause the separate streams to flow at rates which bear a constant ratio to each other, means for introducing air into the first of said streams and for causing such air to combine with unconsumed fuel when present in said stream, means for introducing fuel into the second of said streams and for causing such fuel to combine with excess air when present in the stream, and means automatically actuated in accordance with variations in the difference between the temperature attained in said streams for controlling the flow air to the furnace 21. In combustion control apparatus, the combination of a flue gas analyzer comprising two constant proportion inspirators, means for causing to flow through said inspirators respectively gaseous streams at rates of flow which bear a constant ratio to each other, means for admitting flue gas to each of said inspirators so that it is entrained by each of said streams, means for causing oxygen in the first stream to unite with unconsumed fuel when present in the flue gas entrained thereby, means for causing fuel in the second stream to combine with excess oxygen when present in the flue gas entrained thereby, a member to be controlled, and means automatically actuated according to variations in the difference between the temperatures of the mixtures issuing from the two inspirators for controlling said member.

22. A flue gas analyzer, comprising a constant proportion inspirator, means for causing to flow through said inspirator a stream containing a gas adapted to combine with a constituent of the flue gas, means for admitting flue gas to said inspirator so that it is entrained by said stream, means for causing said gas to combine with said constitutent when present in the flue gas, and indicating mechanism constructed and arranged to be responsive to the heat produced by such combining.

23. A flue gas analyzer, comprising a constant-proportion inspirator, means for introducing into said inspirator a driving jet containing a gas adapted to combine with a constituent of the flue gas, means for admitting flue gas to said inspirator so that it is entrained by said jet, means for causing said gas to combine with said constitutent when present in the flue gas, and indicating mechanism constructed and arranged to be responsive to the heat produced by such combining.

24. In combustion control apparatus, the combination of a flue gas analyzer comprising, two constant proportion inspirators, means for causing to flow through one of said inspirators a stream containing oxygen, means for flowing through the other of said inspirators a stream containing fuel, means for admitting flue gas to each of said inspirators so that it is entrained by each of said streams, means for causing the oxygen of the first stream to unite with unconsumed fuel when present in the flue gas entrained thereby, means for causing fuel in the second stream to combine with excess oxygen when present in the flue gas entrained thereby, a member to be controlled, and means automatically actuated according to variations in the difference between the temperature of the mixtures issuing from the two inspirators for controlling said member.

25. A flue gas analyzer, comprising a constant proportion inspirator, means for directing into said inspirator a jet of hot products of combustion containing a gas adapted to react with a constituent of the flue gas, means for admitting the flue gas to said inspirator so that it is entrained by said jet and any of said constituent which it may contain combines with said gas, and indicating mechanism constructed and arranged to be responsive to the heat produced by such combining.

26. In combustion control apparatus, the combination of a flue gas analyzer comprising two constant proportion inspirators, means for directing into the first of said inspirators a jet of hot products of combustion containing oxygen, means for injecting into the second of said inspirators a jet of hot products of combustion containing unconsumed fuel, means for admitting flue gas to each of said inspirators so that it is entrained by each of said jets, a member to be controlled, and means automatically actuated according to variations in the difference between the temperatures produced by combustion in the mixtures issuing from the two inspirators for controlling said member.

27. A flue gas analyzer, comprising a conduit through which flue gas flows, a burner directed into said conduit, means for supplying fuel and air to said burner in such proportions that the combustion in the burner is imperfect, and indicating mechanism constructed and arranged to be responsive to the heat produced by the combining of a constituent of the flue gas with a constituent of the products of combustion from the burner.

28. A flue gas analyzer, comprising two conduits through which streams of the flue gas flow, a burner directed into the first conduit, means for supplying fuel and air to said burner in constant proportions, the air being in excess of that required to combine with the fuel, a burner directed into the second conduit, means for supplying fuel and air to said burner in constant proportions, the fuel being in excess of that required to combine with the air, means for regulating the fuel supply to said burners so that the heat produced by each is the same, and indicating mechanism constructed and arranged to be automatically actuated according to variations in the difference between the temperatures in said conduits beyond said burners.

29. A flue gas analyzer, comprising a conduit formed to provide a Venturi tube, a gas burner directed into the entrance cone of said Venturi tube, means for supplying fuel and air to said burner in such proportions that the combustion in the burner is imperfect, means for admitting the flue gas to the entrance cone of the Venturi tube, and indicating mechanism constructed and arranged to be responsive to the heat produced by the combining of a constituent of the flue gas with a constituent of the products of combustion of the burner.

30. A flue gas analyzer, comprising two conduits, each formed to provide a Venturi tube, a gas burner directed into the entrance cone of the first Venturi tube, means for supplying a lean mixture of fuel and air to said burner, a burner directed into the entrance cone of the second Venturi tube, means for supplying a rich mixture of fuel and air to said burner, means for admitting the flue gas to the entrance cones of said Venturi tubes, and indicating mechanism constructed and arranged to be automatically actuated according to variations in the difference between the temperatures in said conduits beyond said Venturi tubes.

31. A flue gas analyzer, comprising a conduit containing a constant-proportion inspirator, means for causing a flow of flue gas through said conduit and inspirator, means for admitting to said inspirator a gas supplied at a constant pressure and adapted to combine with a constituent of the flue gas so that such gas is entrained into the stream of flue gas at a rate proportional to the rate of flow of the stream of flue gas, means for causing such gas to unite with said constituent when present in the flue gas, and indicating mechanism constructed and arranged to be responsive to the heat produced by such combining.

32. A flue gas analyzer, comprising two conduits each containing a constant-proportion inspirator, means for causing the flue gas to flow through each of said conduits and inspirators, means for admitting air at atmospheric pressure to the first of said inspirators so that it is entrained into the stream of flue gas at a rate proportional to the rate of flow of the stream, means for causing said air to combine with unconsumed fuel when present in that stream of flue gas, means for supplying gaseous fuel at atmospheric pressure and for admitting such fuel so supplied to the second inspirator so that it is entrained into the second stream of flue gas at a rate proportional to the rate of flow of the stream, means for causing such fuel to combine with excess air present when in that stream of flue gas, and indicating mechanism constructed and arranged to be automatically actuated according to variations in the relative temperatures of the two conduits beyond the inspirators.

33. A gas analyzer, comprising means for mixing with a stream of the flue gas a gas adapted to combine with a constituent of the flue gas, means for preheating said gas sufficiently to cause such combining to take place, and indicating mechanism constructed and arranged to be responsive to the heat caused by such combining.

34. The method of controlling combustion in a furnace, which comprises determining the composition of the flue gas being formed in the furnace as to two different components, and regulating the proportionate rate of air supply to the furnace in accordance with the composition of the flue gas as to the said components so as to maintain such composition substantially at a predetermined point indicating most efficient combustion of the furnace.

35. The method of controlling combustion in a furnace, which comprises continuously determining the composition of the flue gas being produced in the furnace, decreasing the proportionate rate of air supply to the furnace whenever the flue gas contains air in excess of a predetermined minimum, and increasing the proportionate rate of air supply to the furnace whenever the flue gas contains unconsumed fuel in excess of a predetermined minimum.

36. The method of controlling combustion in a furnace, which comprises causing a part of the flue gas to flow through a conduit, continuously supplying to the conduit a gas which will combine with a constituent of the flue gas, and periodically varying the proportionate supply of air to the furnace in accordance with variations of temperature in said conduit.

37. The method of controlling combustion in a furnace, which consists in continuously withdrawing flue gas from the furnace and causing it to flow in two streams, continuously introducing oxygen into one stream under conditions which will cause it to combine with unconsumed fuel when present in said stream, continuously introducing fuel into the second stream under conditions which will cause it to combine with free oxygen when present in said stream, determining the algebraic difference between the temperature attained in the second stream and the temperature attained in the first stream, and regulating the proportionate rate of air supply to the furnace so as to maintain such difference always substantially at a predetermined value by decreasing such rate of air supply when said difference exceeds said value and increasing said rate of air supply when said difference falls below said value.

38. The method of controlling combustion in a furnace adapted for perfect combustion, which consists in continuously withdrawing flue gas from the furnace and causing such flue gas to flow in two streams, continuously introducing oxygen into the first stream under conditions which will cause it to combine with unconsumed fuel when present in that stream, continuously introducing fuel into the second stream under conditions which will cause it to combine with free oxygen when present in said stream, determining the difference between the temperatures attained in the two streams, and regulating the proportionate rate of air supply to the furnace so as to maintain the temperatures of the two streams always substantially equal by decreasing the proportionate rate of air supply whenever the second stream is the hotter and increasing the proportionate rate of air supply whenever the first stream is the hotter.

39. A method of controlling combustion in a furnace which consists in continuously withdrawing flue gas from the furnace and causing it to flow in two streams, continuously introducing oxygen into one of said streams under conditions which will cause it to combine with unconsumed fuel when present in said stream, continuously introducing fuel into the second of said streams under conditions which will cause it to combine with free oxygen when present in said second stream, determining the algebraic difference between the temperature attained in the second stream and the temperature attained in the first stream, and regulating the proportionate rate of air supply to the furnace so as to maintain such difference always substantially at a predetermined value.

40. A method of controlling combustion in a furnace as claimed in claim 39, in which the oxygen and fuel added to the two streams of flue gas are preheated to an extent causing them to combine with all of the fuel and oxygen, respectively, in said flue gas streams.

41. The method of controlling furnace combustion which includes causing combustion of at least some unconsumed fuel or air remaining in flue gas from such furnace, and utilizing the resulting increased temperature of the flue gas to vary the fuel air ratio of the furnace in a direction tending to eliminate the presence of fuel or air in the flue gas.

42. The method of controlling furnace combustion which includes adding heat to a plurality of quantities of flue gas in such manner as to cause combustion of at least one unconsumed element of combustion in one of such quantities, and utilizing the excess of heat in such quantity of flue gas resulting from such combustion to control the supply of an element of combustion to the furnace.

43. The method of controlling furnace combustion, which includes exposing temperature-responsive means to flue gas, causing combustion of at least one unconsumed element of combustion remaining in another portion of flue gas, exposing a second temperature-responsive means to the increased temperature caused by reason of said combustion, and controlling the supply of an element of combustion to the furnace, in accordance with the action of said temperature-responsive means, substantially as described.

44. The method of controlling furnace combustion, which includes causing combustion of at least one element of combustion remaining in the flue gas, comparing the heating effect of a quantity of flue gas so treated with a quantity not so treated, and regulating the supply of an element of combustion to the furnace in accordance with such comparison.

45. Furnace control apparatus, including a plurality of flue gas passages, means for passing predetermined quantities of flue gas therethrough, means for adding heat to the flue gas passing through the passages in such manner as to cause combustion of at least one unconsumed element of combustion in at least one of such passages, and regulating means actuated in accordance with the comparative temperature effect of the flue gas in the passages for controlling the operation of the furnace, substantially as described.

46. Furnace control apparatus, including a plurality of heaters, means for supplying flue gas thereto, at least one of such heaters being adapted to cause combustion of at least one element of combustion remaining in the flue gas, all of the heaters being adapted to normally deliver predetermined quantities of heat, and means responsive to the difference in heating effect of the flue gas leaving the heaters for controlling the operation of the furnace, substantially as described.

47. Furnace control apparatus, including means for causing combustion of at least one unconsumed element of combustion remaining in the flue gas of the furnace, and means actuated in accordance with the comparative heating effect of a quantity of gas so treated with a quantity of gas not so treated, such means being effective for controlling a supply of an element of combustion to the furnace, substantially as described.

48. Furnace control apparatus, including a plurality of temperature responsive means, means for supplying flue gas to one of such means, means for causing combustion of at least one unconsumed element of combustion remaining in another portion of the flue gas and for supplying it to another of such temperature responsive means, and control means actuated in accordance with the comparative effect of the flue gas on the different temperature responsive means, substantially as described.

49. Furnace control apparatus, including a plurality of passages for flue gas from the furnace, heating means for such passages adapted to normally supply predetermined quantities of heat to the flue gas passing therethrough, one of such heating means being adapted to cause combustion of at least some unconsumed fuel remaining in the flue gas passing through such passage, and control means actuated in accordance with the comparative heating effect of the flue gas passing through the passages to control the supply of an element of combustion to the furnace, substantially as described.

50. Furnace control apparatus, including a plurality of passages for flue gas from such furnace, heating means adapted to supply predetermined quantities of heat to the flue gas passing through such passages, means for adding fuel to the flue gas passing through one of such passages, the heating means for such passage being adapted to cause combustion of such fuel with any air remaining in the flue gas, and means responsive to the relative heating effect of the flue gas in such passages for controlling the supply of an element of combustion to the furnace, substantially as described.

51. Furnace control apparatus, including a plurality of passages for flue gas from such furnace, means for heating the flue gas passing through such passages, one of such heating means being adapted to cause combustion of at least some unconsumed fuel in the flue gas passing through the corresponding passage, means for adding fuel to the flue gas passing through another of such passages, the heating means for such passage being adapted to cause combustion of such fuel with any air remaining in the flue gas, and control means responsive to the relative heating effect of the flue gas in the various passages for controlling the supply of an element of combustion to the furnace, substantially as described.

52. Furnace control apparatus, including a plurality of passages for flue gas from the furnace, heating means for each passage, the heating means being adapted to normally deliver predetermined quantities of heat to the flue gas in the several passages, and control apparatus responsive to the relative temperature of the flue gases in the several passages, substantially as described.

In testimony whereof I have hereunto set my hand.

WILLIAM M. HEPBURN.